July 11, 1961     L. R. HETZLER ET AL     2,992,381
REGULATOR CIRCUIT FOR GENERATORS
Filed Dec. 15, 1958
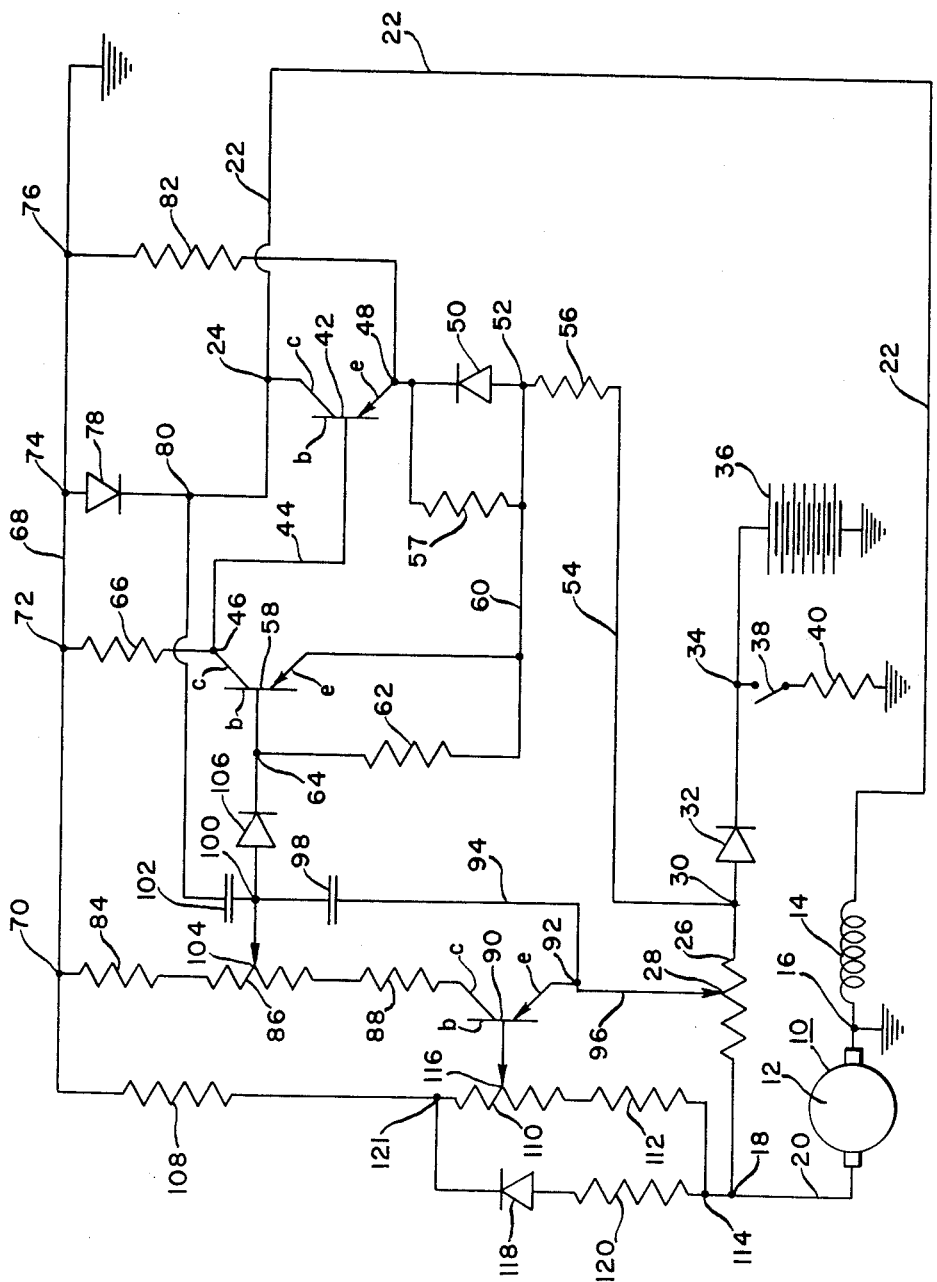
INVENTORS
Lewis R. Hetzler
Leonard J. Sheldrake
BY
Their Attorney

United States Patent Office 2,992,381
Patented July 11, 1961

2,992,381
REGULATOR CIRCUIT FOR GENERATORS
Lewis R. Hetzler and Leonard J. Sheldrake, Anderson, Ind., assignors to General Motors Corporation, Detroit, Mich., a corporation of Delaware
Filed Dec. 15, 1958, Ser. No. 780,374
7 Claims. (Cl. 322—25)

This invention relates to transistor voltage and current regulators of the type that are useful in controlling the output of a direct current power source in a vehicle electrical system and the like. The invention disclosed and claimed herein is an improvement of the invention disclosed and claimed in application S.N. 716,765, filed February 21, 1958, and assigned to the assignee of this invention.

It is an object of this invention to provide a combined voltage and current regulator that includes first and second transistors connected in parallel across a power source and wherein the first transistor is connected in series with the field or control winding of the source to control the output of the source by variable conduction of the transistor, and further wherein the first transistor is connected in series with a pn junction semi-conductor rectifier that is shunted by a resistor, the rectifier being connected in circuit with the second transistor and operating to develop a voltage that aids in cutting off the conduction of the first transistor under certain operating conditions. The resistor that shunts the rectifier permits the field or control current to initially build up and has particular utility where the power source is a self-excited generator.

Another object of this invention is to provide a regulating circuit that includes a first transistor for controlling current flow through the field or control winding of a power source and a voltage dividing network that includes a second transistor for developing voltages that control the conduction of the first transistor, the conduction of the second transistor being controlled by a second voltage dividing network including at least one resistor shunted by a series connected pn junction semi-conductor rectifier and resistor, the conduction of the second transistor being further controlled by the voltage that is developed across a resistor that is connected in series with the power source. In the circuit just described the series-connected rectifier and resistor play an important part in stabilizing the operation of the combined voltage and current regulator.

Still another object of this invention is to provide a battery-charging circuit that includes a combined voltage and current regulator for controlling the output of a power source connected to charge the battery, the regulator including at least one transistor connected in circuit with the control winding of the power source, and having a series-connected resistor and rectifier between the power source and the battery. In this circuit, the rectifier prevents reverse current flow between the battery and power source and the resistor is used to develop a voltage drop that is fed to the regulating circuit to compensate for the voltage drop loss developed across the rectifier.

Further objects and advantages of the present invention will be apparent from the following description, reference being had to the accompanying drawings wherein a preferred embodiment of the present invention is clearly shown.

In the drawings:

The single figure drawing is a schematic illustration of a regulating circuit made in accordance with this invention.

Referring now more particularly to the drawing, a direct current power source generally designated by reference numeral 10 takes the form of a direct current generator having an armature 12 and a field winding 14. The output voltage of the generator, as is well-known to those skilled in the art, is controlled as a function of current flow through the field winding. One side of the armature 12 of the generator is connected directly to ground via junction 16 whereas the opposite side of the armature 12 is connected with a junction 18 via lead 20. One side of the field winding 14 is grounded through junction 16, whereas the opposite side of the field winding is connected with a lead 22 which is in turn connected with junction 24. The voltage developed by the armature 12 is applied between junction 18 and ground and this forms a two-terminal D.C. supply circuit.

A resistor 26 which is tapped as at 28 is connected between junction 18 and junction 30. A pn junction semiconductor rectifier designated by reference numeral 32 is connected between junctions 30 and 34. The rectifier is preferably of the silicon type having a relatively low forward voltage drop. The junction 34 is connected to one side of a storage battery designated by reference numeral 36, the opposite side of the storage battery being connected directly to ground as shown. The junction 34 is also connected to one side of an electric switch 38 which is connected with the electrical loads of a motor vehicle designated by reference numeral 40. The opposite side of the electrical loads are connected directly to ground as shown. It will be appreciated that where the circuit is used on a motor vehicle, the armature 12 of the generator will be driven by the engine of the vehicle and that the electrical loads 40 will be typical D.C. loads found on motor vehicles. It will also be appreciated that the load current supplied to electrical loads 40 and battery 36 pass through the resistor 26 and through the rectifier 32. The rectifier 32 prevents reverse current flow from the battery toward the generator 10. Where the power source is an A.C. generator fitted with rectifiers, these rectifiers may be used to prevent reverse current flow so that the rectifier 32 in such an arrangement would not be necessary.

The current flow through field winding 14 of the generator is controlled by a transistor 42 having a collector electrode $c$, a base electrode $b$, and an emitter electrode $e$. The collector electrode of transistor 42 is connected with junction 24 and thus is connected with lead 22. The base electrode of transistor 42 is connected with a lead wire 44 which is in turn connected with junction 46. The emitter electrode of transistor 42 is connected with a junction 48. The junction 48 is connected with one side of a pn junction semi-conductor rectifier 50 which may be of the silicon type. The rectifier 50 has its opposite side connected with junction 52 and this junction is connected with junction 30 via lead 54. A resistor 56 is connected between junctions 52 and junction 30. A resistor 57, the purpose of which will be more fully described hereinafter, is connected in parallel with rectifier 50 as is clear from the drawing. The field circuit for the field winding 14 may now be traced from armature 12 through lead 20, through resistor 26, through lead 54, through resistor 56, through rectifier 50, through the emitter-to-collector path of transistor 42, through lead 22, and thence through field winding 14 to ground. With this arrangement, the field current of generator 10 will be controlled by the conduction of transistor 42 so as to control the output voltage of generator 10.

A second transistor 58 is provided having an emitter electrode $e$, a base electrode $b$, and a collector electrode $c$. This transistor like transistor 42 is a pnp transistor. The emitter electrode of transistor 58 is connected with a lead 60 which also is connected to one side of resistor 62. The opposite side of resistor 62 is connected to the base electrode of transistor 58. The collector electrode of transistor 58 is connected with junction 46 which is in turn connected to one side of resistor 66. The opposite side of resistor 66 is connected with a lead wire 68 which forms a common connection for junctions 70, 72, 74 and 76. The lead wire 68 is connected directly to ground as shown, and thus is at ground potential. A rectifier 78 is connected between junction 74 and junction 80. A resistor 82 is connected between junctions 48 and 76.

The regulating circuit of this invention includes a first voltage dividing network comprised of resistors 84, 86, 88 and the emitter-to-collector path of transistor 90 having a collector electrode $c$, an emitter electrode $e$ and a base electrode $b$. The emitter electrode of transistor 90 is connected with junction 92 which is in turn connected with lead wires 94 and 96. The lead wire 96 is connected with the tap point 28 on resistor 26, whereas the lead wire 94 is connected to one side of condenser 98. The opposite side of condenser 98 is connected with a junction 100. A second condenser 102 is connected between junctions 80 and 100. The resistor 86 is tapped at 104 and this tap point may be shifted to vary the regulating point of the regulator. A Zener diode 106 is connected between junctions 100 and 64. The Zener diode, as is well known to those skilled in the art, is a semiconductor having the characteristic of preventing reverse current flow up to the point where a critical voltage is applied across it. After this critical voltage is exceeded, the diode breaks down and conducts current in reverse direction. When the Zener diode is conducting in a reverse direction, it operates as a constant voltage device in that changes in current flow through the diode in a reverse direction produce little or no change in voltage drop across it. The purpose of the Zener diode in the circuit will be more fully described hereinafter.

A second voltage-dividing network is provided which includes resistors 108, 110 and 112. This voltage dividing network is connected between junction 114 and lead wire 68 which is grounded. The resistor 110 is of the variable potentiometer type having a tap point 116 which may be shifted to vary the current regulating characteristic of the regulator. The base electrode $b$ of transistor 90 is connected with tap point 116 as is clearly apparent from the drawing.

The resistors 110 and 112 are shunted by a pn junction semi-conductor rectifier 118 and a resistor 120. The series connected rectifier 118 and resistor 120 play an important part in stabilizing the operation of the regulator circuit.

By way of example and not by way of limitation, the circuit elements just described may have the following values in a 12 volt system:

| Circuit element: | Value |
|---|---|
| Resistor 120 | ohms 1 |
| Resistor 108 | do 300 |
| Resistor 110 | do 20 |
| Resistor 112 | do 20 |
| Resistor 84 | do 130 |
| Resistor 86 | do 50 |
| Resistor 88 | do 65 |
| Resistor 62 | do 30 |
| Resistor 66 | do 390 |
| Resistor 58 | do 4.7 |
| Resistor 82 | do 750 |
| Resistor 26 | do .02 |
| Resistor 56 | do .01 |
| Field 14 | do 3 |
| Condenser 102 | mfd .05 |
| Condenser 98 | mfd 40 |

Considering now the operation of the circuit shown in the drawing, the transistor 42, as has been noted hereinbefore, controls the field current flow through field winding 14. The conduction of transistor 42 is in turn controlled by the conduction of transistor 58. When the transistor 58 is substantially fully conductive, the transistor 42 is substantially fully non-conductive and vice versa. This is true because of the parallel circuit arrangement of the transistors with the transistor 58 shunting current away from transistor 42 when transistor 58 is substantially fully conductive. As will be more fully described hereinafter, the transistor 42 is operated either at its substantially fully conductive state or its substantially fully non-conductive state in order that the transistor will never have stable operation at its half current point where it is highly inefficient. In actual operation, the transistor 42 periodically becomes fully conductive and fully non-conductive at a rapid rate when current or voltage regulation is required.

The conduction of transistor 58 is controlled as a function of the voltage applied across the emitter and base electrodes of this transistor. This voltage is determined by the potential difference between junctions 30 and 104, this difference being equal to the voltage drop between junctions 28 and 104 less the voltage drop across the right side of resistor 26 up to the tap point 28. The voltage drop across resistor 56 also subtracts from the voltage being developed between junctions 28 and 104 and this voltage which is proportional to field current tends to drive the transistor 42 either to its substantially fully conductive state or its substantially fully non-conductive state. It will be appreciated that with the Zener diode 106 conducting current in a reverse direction, it operates as a constant voltage device so that junction 64 is maintained substantially at a constant voltage with respect to junction 100.

Considering now the voltage regulating characteristic of the circuit illustrated in the drawing, if the voltage output of the generator 12 increases to an undesirable level, this voltage is reflected in an increase in voltage between junctions 28 and 104. During the time that current regulation is not required, the voltage drop across resistor 112 and the lower portion of resistor 110 is of such a value as to cause considerable base current in transistor 90, thus causing considerable emitter-to-collector current in transistor 90. When current regulation is not required therefor, the transistor 90 is substantially fully conductive and there is very little voltage drop across it between emitter and collector. During voltage regulation the control voltage is thus developed mainly across resistor 88 and the lower portion of resistor 86. As this voltage increases, the voltage applied between the emitter and base electrodes of transistor 58 increases reducing the voltage from emitter to collector. This reduces the emitter to base current of transistor 42 making transistor 42 less conductive from emitter to collector. This process continues until transistor 42 is rendered substantially non-conductive so as to reduce field current and thus bring the voltage output of the generator 12 back to its regulated value. When the voltage of generator 12 is below a desired regulated value, the voltage applied across the emitter and base electrodes of transistor 58 is decreased to reduce its conduction, and therefore increase the conduction of transistor 42. This process will then continue until the transistor 42 becomes substantially fully conductive, thus increasing field current and bringing the voltage output of the generator back up to its desired regulated value. In describing this operation, it is to be appreciated that the current flow through resistor 56 is either increasing or decreasing so that the voltage drop across resistor 56 is either increasing or decreasing. This change in voltage across resistor 56 changes the potential of junction 52 in such a direction as to tend to drive transistor 58 either to its fully conductive or fully non-conductive state. With transistor 58 being driven to either its fully conductive or fully non-conductive state, the transistor 42 operates oppositely so that the current is constantly being turned on and off by transistor 42.

The pn junction semi-conductor rectifier 50 develops a voltage drop which tends to cut off the conduction of transistor 42 when transistor 58 is fully conductive. This will be readily apparent from the circuit arrangement as the potential of junction 52 will be impressed upon the base electrode of transistor 42 through transistor 58 when it is substantially fully conductive from emitter to collector. This voltage drop across rectifier 50 is thus effectively impressed across the emitter and base electrodes of transistor 42 to tend to bias this transistor to a non-conductive state during the time that transistor 58 is fully conductive. The resistor 56 and rectifier 50 thus tend to insure that transistor 42 will be operated either substantially fully conductive or substantially fully non-conductive.

The resistor 57 plays an important function in the circuit as it permits current to flow through the transistor 42 from emitter to collector during the time that the generator 12 is building up. Without the resistor 57, the rectifier 50 would to some extent prevent rapid build-up of the generator 10. This is true because the threshold voltage of the rectifier must be overcome before the rectifier will pass current to the transistor 42. The resistor 57 then operates as a by-pass for field current during the time the generator 10 is building up.

When current regulation is required, the voltage drop across the left side of resistor 26 up to the tap point 28 exceeds the voltage drop between junctions 114 and 116 to decrease the conduction of transistor 90 from emitter to collector. When the conduction of transistor 90 is decreased, a greater voltage drop is realized across it from emitter to collector with a consequent increase in voltage drop between junctions 28 and 104. With an increase in voltage drop between junctions 28 and 104, the conduction of transistor 58 is of course increased and the conduction of transistor 42 decreased to reduce the field current through field winding 14 and thus reduce output voltage of generator 10. In considering the current regulating aspects of the present invention, it is seen that the voltage between junctions 114 and 121 is maintained substantially constant by reason of the use of pn junction semi-conductor rectifier 118 which has a constant voltage characteristic. This voltage may vary to some extent, however, because of the connection of resistor 120 in series with rectifier 118. It has been found that this series connection of the resistor 120 and pn junction rectifier 118 tends to stabilize the operation of the regulator to bring about effective current regulation.

The portion of resistor 26 to the right of junction 28 develops a voltage drop which tends to compensate for the voltage drop loss which occurs across rectifier 32. This voltage drop, as will be apparent to those skilled in the art, is of such a polarity as to tend to increase the regulated voltage point of the regulator circuit. Thus the apparent voltage sensed by the regulating circuit between junctions 104 and 30 will be decreased by the voltage drop across the right-hand portion of resistor 26 and this will cause the regulating circuit to increase the output voltage of the generator 12 to compensate the voltage drop across rectifier 32. This voltage drop across the portion of resistor 26 to the right of junction 28 is of course proportional to current being supplied to loads 40 and battery 36.

The condenser 98 operates as a filter to smooth some of the ripple which appears on the D.C. voltage and which affects the point of voltage regulation. The condenser 102 is used to provide a feed-back signal when a change in current in field winding 14 begins to occur. The rectifier 78 is used to assist in suppressing the voltage transient which will occur when the field current is moving toward zero value.

While the embodiment of the present invention as herein disclosed constitutes a preferred form, it is to be understood that other forms might be adopted.

What is claimed is as follows:

1. In combination, a generator having a field winding, a first transistor having base, emitter and collector electrodes, a second transistor having base, emitter, and collector electrodes, means connecting the emitter-collector path of said first transistor in series with said field winding and across the output terminals of said generator, a pn junction semi-conductor rectifier shunted by a resistor connected in series with said first transistor, means connecting the emitter electrode of said second transistor with the emitter electrode of said first transistor through said rectifier, means connecting the collector electrode of said second transistor with the base electrode of said first transistor and in circuit with said generator, means connecting the base electrode of said second transistor in circuit with said generator, and means for applying a voltage across the emitter and base electrodes of said second transistor that varies in accordance with changes in output voltage of said generator.

2. In combination, a generator having a field winding, a first transistor having base, emitter and collector electrodes, a second transistor having base, emitter, and collector electrodes, means connecting the emitter-collector path of said first transistor in series with said field winding and across the output terminals of said generator, a pn junction semi-conductor rectifier shunted by a resistor connected in series with said first transistor, means connecting the emitter electrode of said second transistor with the emitter electrode of said first transistor through said rectifier, means connecting the collector electrode of said second transistor with the base electrode of said first transistor and in circuit with said generator, means connecting the base electrode of said second transistor in circuit with said generator, and means for applying a voltage across the emitter and base electrodes of said second transistor that varies in accordance with changes in output current of said generator.

3. In combination, a generator having a field winding, a first transistor having base, emitter and collector electrodes, a second transistor having base, emitter, and collector electrodes, means connecting the emitter-collector path of said first transistor in series with said field winding and across the output terminals of said generator, a pn junction semi-conductor rectifier shunted by a resistor connected in series with said first transistor, means connecting the emitter electrode of said second transistor with the emitter electrode of said first transistor through said rectifier, means connecting the collector electrode of said second transistor with the base electrode of said first transistor and in circuit with said generator, means connecting the base electrode of said second transistor in circuit with said generator, and means for applying a voltage across the emitter and base electrodes of said second transistor that varies in accordance with changes in output voltage and current of said generator.

4. In combination, a power source having a control winding for varying the output voltage of the source as a function of current flow therethrough, a first transistor having base, emitter, and collector electrodes, a direct current load circuit connected to be energized by said power source, means connecting the emitter-collector circuit of said first transistor and said control winding in series across said load circuit, a second transistor having base, emitter and collector electrodes, a first voltage dividing network connected across said load circuit and including the emitter-collector circuit of said second transistor, a second voltage dividing network connected across said load circuit including a first resistor, a series-connected pn junction semi-conductor rectifier and resistor connected in parallel with said first resistor, a third resistor connected in series with said power source, a control circuit for controlling the conduction of said first transistor, means connecting said control circuit and said first voltage dividing network, and means for applying the difference in voltage between the voltage developed across said first and third resistors across the emitter and base electrodes of said second transistor.

5. In combination, a power source having a control winding for varying the output voltage of the source as a function of current flow therethrough, a first transistor having base, emitter, and collector electrodes, a direct current load circuit connected to be energized by said power source, means connecting the emitter-collector circuit of said first transistor and said control winding in series across said load circuit, a voltage dividing network connected across said load circuit including a first resistor, a series connected pn junction semi-conductor rectifier and resistor connected in parallel with said first resistor, a third resistor connected in series with said power source, a voltage responsive control circuit for controlling the conduction of said first transistor, and means connecting said voltage responsive control circuit and said first and third resistors.

6. In combination, a power source having a control winding for controlling the voltage output of said source as a function of current flow therethrough, a load circuit connected with said power source to be energized thereby, a storage battery connected with said load circuit, a rectifier connected between said power source and said battery for preventing current flow from said battery toward said power source, a transistor, means connecting said transistor and said control winding in series across said load circuit whereby the current flow through said control winding is controlled as a function of the conductance of said transistor, means for developing a first voltage that is proportional to output voltage of said power source, means for generating a second voltage that is proportional to output current of said power source, means for generating a third voltage that is proportional to output current of said power source, and means for controlling the conduction of said transistor in response to said first, second, and third voltages, said first and second voltages providing voltage and current regulation and said third voltage providing compensation for the voltage drop across said rectifier.

7. In combination, a generator having a field winding, a first transistor, means connecting the emitter-collector path of said first transistor in series with said field winding and in circuit with said generator whereby the field current of said generator is controlled as a function of the conductance of said first transistor, a pn junction semi-conduction rectifier shunted by a resistor connected in series with said first transistor, a second transistor controlling the conduction of said first transistor and connected in circuit therewith, and means for applying a voltage across the emitter and base electrodes of said second transistor that varies in accordance with changes in the output voltage of said generator.

References Cited in the file of this patent

UNITED STATES PATENTS

| | | |
|---|---|---|
| 2,809,301 | Short | Oct. 8, 1957 |
| 2,892,143 | Sommer | June 23, 1959 |

FOREIGN PATENTS

| | | |
|---|---|---|
| 289,939 | Great Britain | May 2, 1928 |